Dec. 11, 1951    H. S. GREENE    2,578,062
PLUMB BOB SHIELD
Filed March 17, 1950
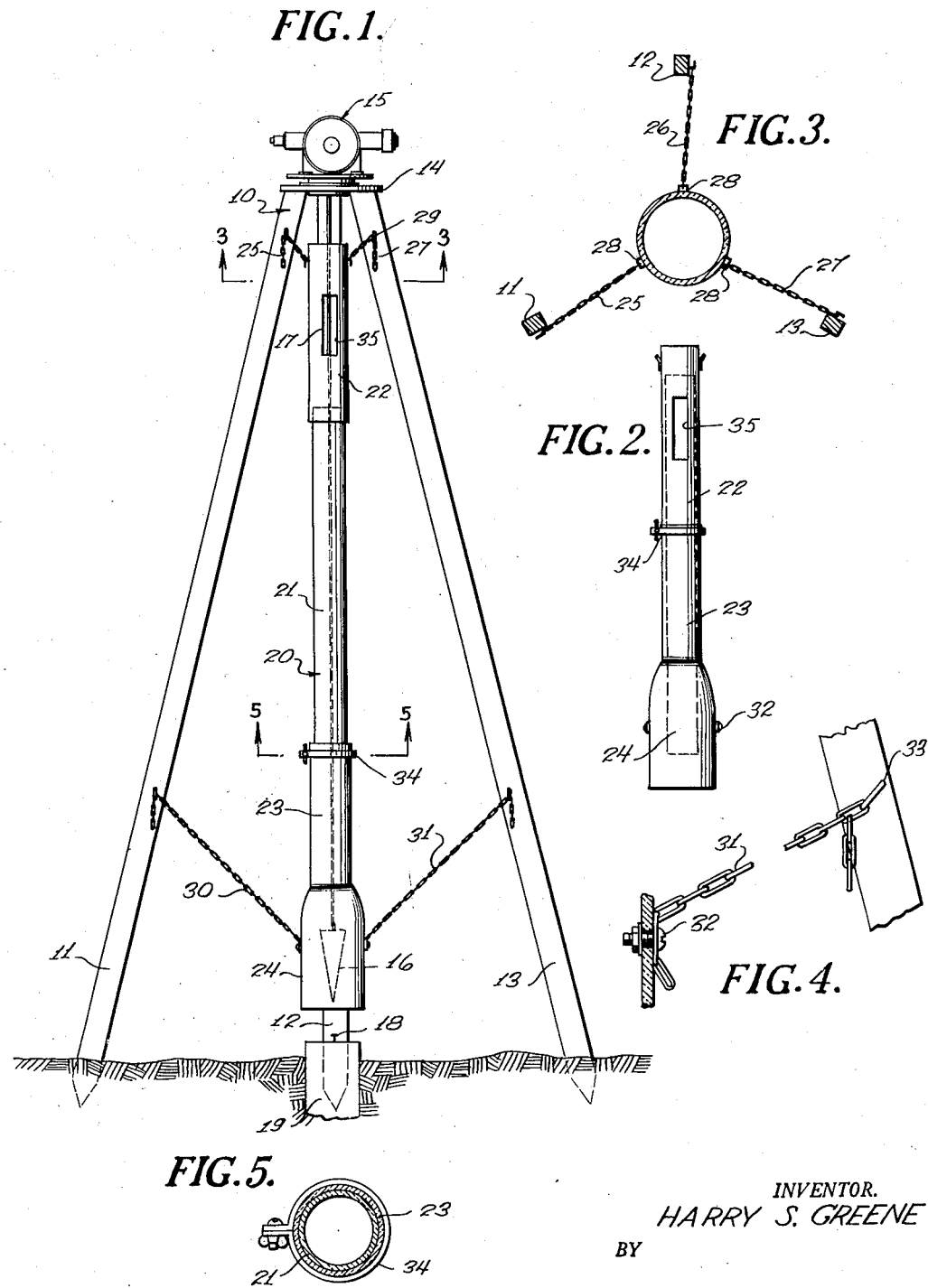
INVENTOR.
HARRY S. GREENE
BY
McMorrow, Berman + Davidson
ATTORNEYS Patented Dec. 11, 1951

2,578,062

UNITED STATES PATENT OFFICE 2,578,062

PLUMB BOB SHIELD

Harry S. Greene, Bryan, Ohio

Application March 17, 1950, Serial No. 150,179

4 Claims. (Cl. 33—216)

This invention relates to plumb bob shields, and more particularly to a shield which can be suspended from a surveyor's transit to shield a plumb bob also suspended from the transit.

It is among the objects of the invention to provide an improved plumb bob shield which will extend from a tripod supported transit substantially to the ground and is made in telescopically associated sections which render it adjustable in length to accommodate it to variations in this distance, which incloses the plumb bob and the plumb line or cord and is formed, at least partially, of transparent material so that the plumb bob and plumb line are clearly visible through the shield, which has an opening providing access to the plumb line for adjusting the length of the line, and which is light in weight, collapsible to a reduced volume for transportation and storage, economical to manufacture, attachable to a transit tripod with no material modification of the tripod, and does not interfere with the normal operation of the transit and the plumb bob suspended therefrom.

Other objects and advantages will become apparent from a consideration of the following description and appended claims in conjunction with the accompanying drawing, wherein:

Figure 1 is a side elevational view of a transit, tripod, plumb bob and shield assembly, the shield being illustrative of the present invention;

Figure 2 is a longitudinal elevational view of the shield in collapsed condition;

Figure 3 is a transverse cross-section on an enlarged scale on the line 3—3 of Figure 1;

Figure 4 is a cross-sectional view of a fragmentary portion of the device showing a structural detail; and Figure 5 is a transverse cross-section on an enlarged scale on the line 5—5 of Figure 1.

With continued reference to the drawing, the numeral 10 generally indicates a tripod of known or conventional construction having three elongated legs 11, 12 and 13, usually formed of wood, secured at their upper ends to a transit table 14, and the numeral 15 generally indicates a surveyor's transit of known or conventional construction mounted on the table 14 in the usual manner.

For certain purposes in surveying, it is necessary to mount the transit exactly over a predetermined point on the ground and for this purpose a plumb bob 16 is suspended from the center of the transit table by a plumb line 17, the pointed lower end of the plumb bob being brought over a point which may be indicated by a brad 18 in the upper end of a marker stake 19.

When the plumb bob and transit assembly are used in windy weather, the wind has a tendency to cause the plumb bob to sway from side to side or to hold a position out of the true vertical and it thus either consumes a large amount of time to properly set the transit or becomes impossible to accurately set the transit over the particular point. In order to overcome this difficulty, the present invention provides the plumb bob shield, generally indicated at 20, which incloses the plumb bob and the plumb line and eliminates the disturbing effect of the wind.

This shield comprises an intermediate tubular member 21, an upper tubular member 22 having an inside diameter substantially equal to the outside diameter of the intermediate member 21 and having a length materially shorter than the length of the intermediate member, each upper member telescopically receiving at its lower end the upper end of the intermediate member, and a lower tubular member 23 which also has an inside diameter substantially equal to the outside diameter of the intermediate member and telescopically receives at its upper end the lower end of the intermediate member. The lower member 23 is shorter than the intermediate member and has at its lower end a portion 24 which is belled or flared out to provide an end portion of increased diameter immediately surrounding the plumb bob 16.

The upper tubular member 22 is connected near its upper end to the tripod near the upper end of the latter by means of three short chains 25, 26 and 27, the inner ends of which are connected to the upper member at substantially equal angular intervals therearound by suitable means, such as the screws 28, and are connected respectively to the legs 11, 12 and 13 by means of hooks 29 secured in the legs of the tripod and over which hooks selected links of the chains are engaged.

The lower tubular member 23 is connected near its lower end to the legs of the tripod intermediate the length of the latter by similar short chains, two of which are illustrated in Figure 1, and indicated at 30 and 31. These chains are connected to the lower tubular member 23 at substantially equal angular intervals therearound by the screws 32 and are connected to the legs of the tripod respectively by hooks 33 inserted into the tripod legs and over which hooks selected links of the chain are engaged. An adjustable clamp band 34 surrounds the lower tubular member 23 near the upper end of the latter to clamp this member to the intermediate member 21 for holding the intermediate member in adjusted position between the two end members 22 and 23.

When the shield is removed from the tripod, it may be telescopically collapsed to the reduced volume illustrated in Figure 2, for transportation and storage.

Preferably, all three of the tubular sections are formed of a thin walled, semi-transparent material, such as "Lucite," or other suitable synthetic resin material, but the lower end section 22 at least is made transparent so that the location of the plumb bob 16 can be accurately observed. The upper tubular member is provided intermediate its length with an opening 35 which provides access to the plumb line 17 so that the plumb line can be shortened, as may be necessary, by making a knot therein.

The supporting chains hold the shield rigidly in position relative to the tripod, and, since the shield encloses the plumb bob and the plumb line, the wind cannot have any effect on the plumb bob and cause it to sway or deviate from a true vertical position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A plumb bob shield comprising an intermediate tubular member, a first tubular end member of larger diameter and shorter length than said intermediate member telescopically receiving one end of the latter, means connected to said first tubular end member for attaching said shield to a tripod near one end of the latter, a second tubular end member of larger diameter and shorter length than said intermediate member telescopically receiving the other end of said intermediate member, and means connected to said second end member for attaching said shield to the tripod near the other end of the latter, said shield being suspended by said attaching means within the tripod to enclose a plumb bob and plumb line suspended from a tripod carried transit.

2. A plumb bob shield for a surveyor's transit comprising an elongated tubular intermediate member, a tubular upper member telescopically associated at its lower end with the upper end of said intermediate member, flexible means secured to said upper member for attaching the upper member to a transit tripod near the upper end of the latter, a tubular lower member telescopically associated at its upper end with the lower end of said intermediate member, and flexible means attached to said lower member for connecting the lower member to a transit tripod intermediate the length of the latter, said lower member being formed of a transparent material.

3. A plumb bob shield comprising an intermedate tubular member, a first tubular end member of larger diameter and shorter length than said intermediate member telescopically receiving one end of the latter, means connected to said first tubular end member for attaching said shield to a tripod near one end of the latter, a second tubular end member of larger diameter and shorter length than said intermediate member telescopically receiving the other end of said intermediate member, and means connected to said second end member for attaching said shield to the tripod near the other end of the latter, said shield being suspended by said attaching means within the tripod to enclose a plumb bob and plumb line suspended from a tripod carried transit and having an enlarged lower end portion for receiving a plumb bob.

4. A plumb bob shield for a surveyor's transit comprising an elongated tubular intermediate member, a tubular upper member telescopically associated at its lower end with the upper end of said intermediate member, flexible means secured to said upper member for attaching the upper member to a transit tripod near the upper end of the latter, a tubular lower member telescopically associated at its upper end with the lower end of said intermediate member, and flexible means attached to said lower member for connecting the lower member to a transit tripod intermediate the length of the latter, said lower member being formed of a transparent material and said upper tubular member having an opening therein providing access to the plumb line extending through the shield.

HARRY S. GREENE.

REFERENCES CITED

The following references are of record in the file of this patent:

UNITED STATES PATENTS

| Number | Name | Date |
| --- | --- | --- |
| 1,246,960 | Logan | Nov. 20, 1917 |
| 1,780,501 | Osinga | Nov. 4, 1930 |
| 1,952,745 | Deasy | Mar. 27, 1934 |
| 2,184,505 | Danley | Dec. 26, 1939 |